A. H. SISSON.
CAR CONSTRUCTION.
APPLICATION FILED JULY 20, 1910.

1,112,855.

Patented Oct. 6, 1914.
7 SHEETS—SHEET 3.

A. H. SISSON.
CAR CONSTRUCTION.
APPLICATION FILED JULY 20, 1910.

1,112,855.

Patented Oct. 6, 1914.
7 SHEETS—SHEET 4.

A. H. SISSON.
CAR CONSTRUCTION.
APPLICATION FILED JULY 20, 1910.

1,112,855.

Patented Oct. 6, 1914.
7 SHEETS—SHEET 5.

Witnesses:

Inventor
Albert H. Sisson.

UNITED STATES PATENT OFFICE.

ALBERT H. SISSON, OF CHICAGO, ILLINOIS, ASSIGNOR TO FORSYTH BROTHERS COMPANY, OF CHICAGO, ILLINOIS, A CORPORATION OF ILLINOIS.

CAR CONSTRUCTION.

1,112,855.  Specification of Letters Patent.  Patented Oct. 6, 1914.

Application filed July 20, 1910. Serial No. 572,872.

*To all whom it may concern:*

Be it known that I, ALBERT H. SISSON, a citizen of the United States, and a resident of Chicago, in the county of Cook and State of Illinois, have invented certain new and useful Improvements in Car Construction, of which the following is a specification.

My invention relates to car construction and has particular reference to a form of car in which the car posts or various other parts of the car may be made integral with either the outer or inner structure, sheathing or finish.

According to the usual construction which is used in railway and other cars, the car posts are made separate from the structure or sheathing and the latter is riveted or otherwise suitably fastened thereto. This necessitates considerable extra work in constructing the car and, moreover, the completed structure has not the strength nor lightness which is obtained in the cars built according to my improvements.

As will be described in detail hereafter, I sometimes construct the car posts integral with the outer sheathing of the car and in some cases construct them integral with the inner sheathing thereof; and may also construct the post wholly or in part out of both the inner and outer sheathing. I also construct the sash frames, having grooves in which the window sashes operate, preferably integral wholly or partially with either the outer or inner sheathing of the car. Again, in some cases I have found it of advantage to continue the car posts into the roof of the car so that the car-lines are made integral with the side posts.

In still another modification of my invention I employ car posts which have obliquely disposed inclined brace members preferably integral therewith, and also integral with either the outer or inner sheathing of the car. I also show the post laterally supported by an off-set or formation in a part of the sheathing adjacent thereto.

It will be apparent from the above general description of the objects of my invention that I may construct a car in which the car posts are integral with either the outer or inner sheathing of the car at either the upper or lower portions of the car posts; also the posts may be made integral with both the outer and inner sheathings at either the upper or lower portions of the posts, or both. I have also found that if the car posts are constructed separately from the sheathing, certain other structures as, for example, the sash frames or openings, may be advantageously made integral with either the outer or inner sheathing.

These and other advantages of my invention will be more apparent by reference to the accompanying drawings which represent preferred embodiments of my improvements, and in which.

Figure 1:
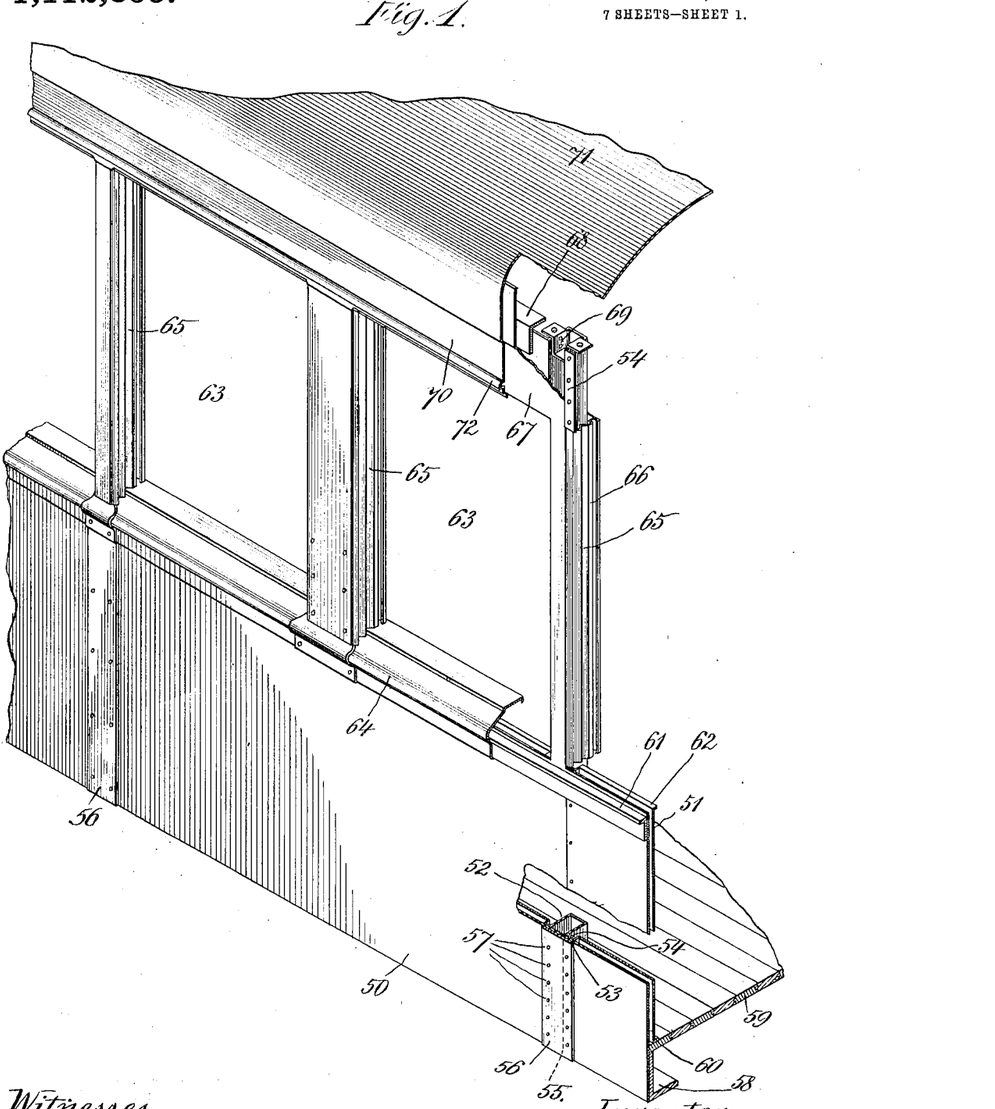
Figure 1 is a perspective fragmentary view showing portions of the side and roof of a car, a part of the side of the car being broken away to show the relative construction of one of the car posts and the outer and the inner sheathing. In this figure the car post is shown integral with the inside sheathing, and the grooved portion of the window frame and the letter board are shown integral with the outside sheathing.

In the form of my invention which is illustrated in Fig. 1, 50 is the outside sheathing of the car, and, 51 is the inside sheathing thereof. It will be noticed that the car post, 52, is formed integral with the inside sheating, 51. As shown in the section of the car post in Fig. 1, I find an advantageous construction to be that in which the post is formed near the edge of one of the sheets of the inside sheathing, the continuous sheet having a lip portion 53 which extends beneath the flange 54 of the post 52. It will be noted that the outside sheathing 50 forms the outer side of the car post 52, and when a joint, as for example, 55, occurs between two of the sheets of the outside sheathing 50, I prefer to have this joint located toward one side of the post. The cover strip 56, which lies outside of each of the joints 55, is fastened to the outer sheathing 50, by means of the rivets 57.

At the lower portion of the side of the car is provided the angle or other desirable shape of side sill, 58, above which is located the floor 59, of the car. The lower edge of the inside sheathing 51, is preferably bent to form the flange 60, engaging the floor, 59, or a suitable angle iron may be riveted to the lower edge of the inside sheathing, if this construction is preferred.

Directly below the window openings is the truss member 61 in the form of an angle iron. This truss member is preferably riveted to the outer sheathing 50 and runs continuously through the length of the car. The inner sheathing 51 is preferably provided at its upper edge with the flange 62 which is riveted to the sash stool 64. The side of the car is provided with a number of openings 63, which are adapted to contain the window sashes. An examination of Fig. 1 will further show that the sash guides 65, having the sash grooves 66, are made integral with the outer sheathing 50. Moreover, this outer sheathing is also extended to form the inner part 67, of the letter-board. The car posts 52, are joined by means of the side plate angles, 68, which are joined to the upper ends of these posts by means of the brackets 69 riveted to said side plate angles. The outer portion 70 of the letter-board is formed integral with the deck roof 71 of the car. Near its lower edge, this letter-board is provided with the drip projection 72 and is fastened to the outer sheathing of the car.

Figures 2, 23, 27, 28:
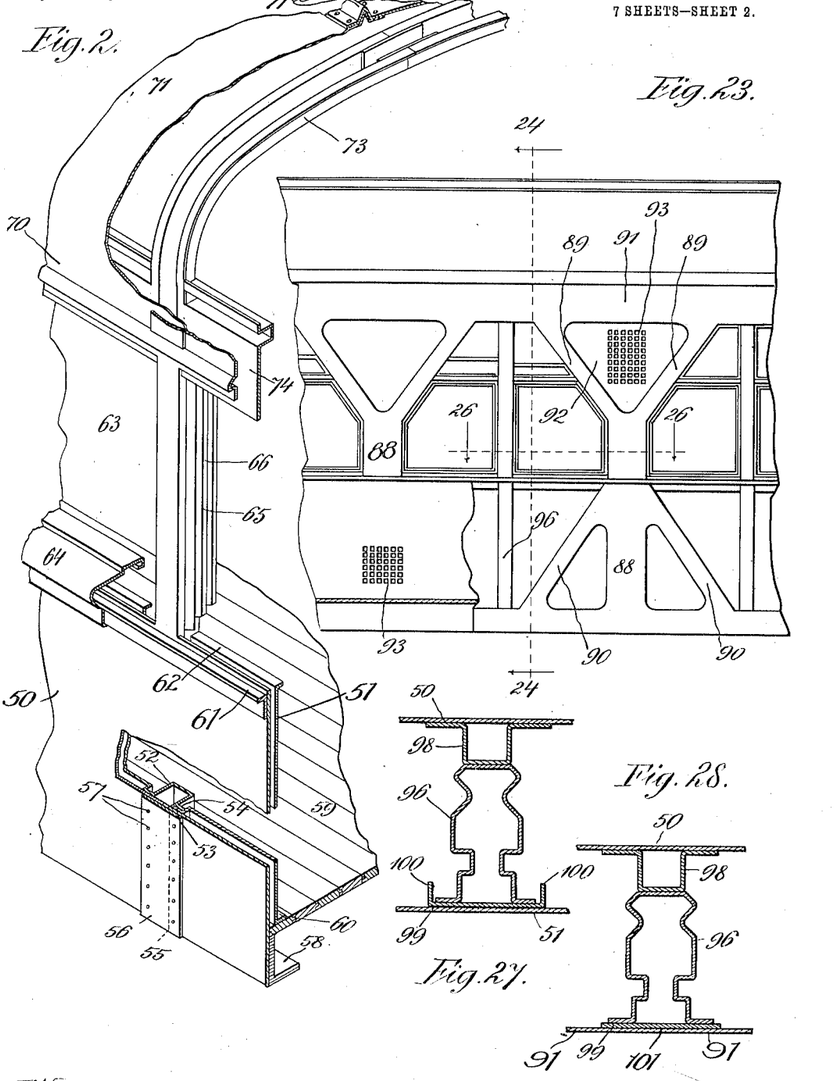
Fig. 2 is a perspective fragmentary view of the side and roof of the car, similar to Fig. 1, except the carlines are shown as integral with the inside sheathing and car posts. The roof is shown as integral with the letter board, the grooved portion of the sash frame and the outside sheathing.
Fig. 23 is a fragmentary side elevation taken from the inside of a car showing alternate posts formed with obliquely disposed braces at their tops and bottoms, these posts being formed from the inside sheathing. The frieze or inside finish at the top of the car posts is integral with these posts.
Fig. 27 is a sectional view through the lower portion of one of the intermediate posts taken on the line 27—27 of Fig. 24.
Fig. 28 is a sectional view taken at the top portion of one of the intermediate posts and showing the connection between the posts with the diagonally disposed members shown in Fig. 23.
Figures 3, 4:
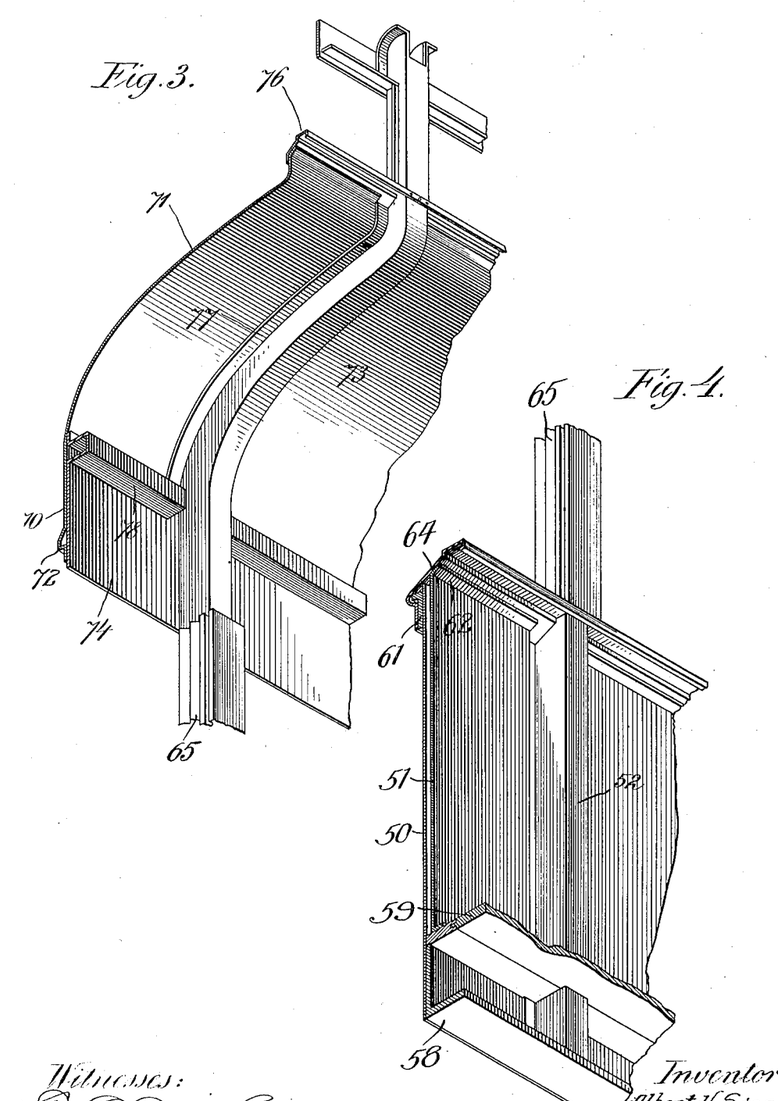
Fig. 3 is a fragmentary perspective view of the inside of the upper portion of the side and a part of the roof of the car in which a monitor roof is used. The car post is shown as integral with the carline, which extends to the deck plate. The roof extends to the deck sill.
Fig. 4 is a fragmentary perspective view from the inside showing the lower portion of the side of a car, the upper part of which is constructed as shown in Fig. 3.

Turning now to the modification shown in Fig. 2, it will be noticed that the construction in this case is much similar to that illustrated in Fig. 1, except that the car-line 73 is made continuous with the car post 52. The side plate 74 is made integral with the inner sheathing 51 of which the car post 52 and the carline 72 are constructed. The deck roof 71 is constructed integral with the outside portion 70 of the letter-board and is also integral with the outside sheathing 50 of which the guide frames 65 are likewise constructed. While the deck roof might comprise a single sheet extending clear across, it may, if desired, be made up of a plurality of sheets which are off-set and interlockingly lapped with each other and riveted together as shown at the joint 71ª.

Figures 5, 6, 7, 8, 9, 10, 11:
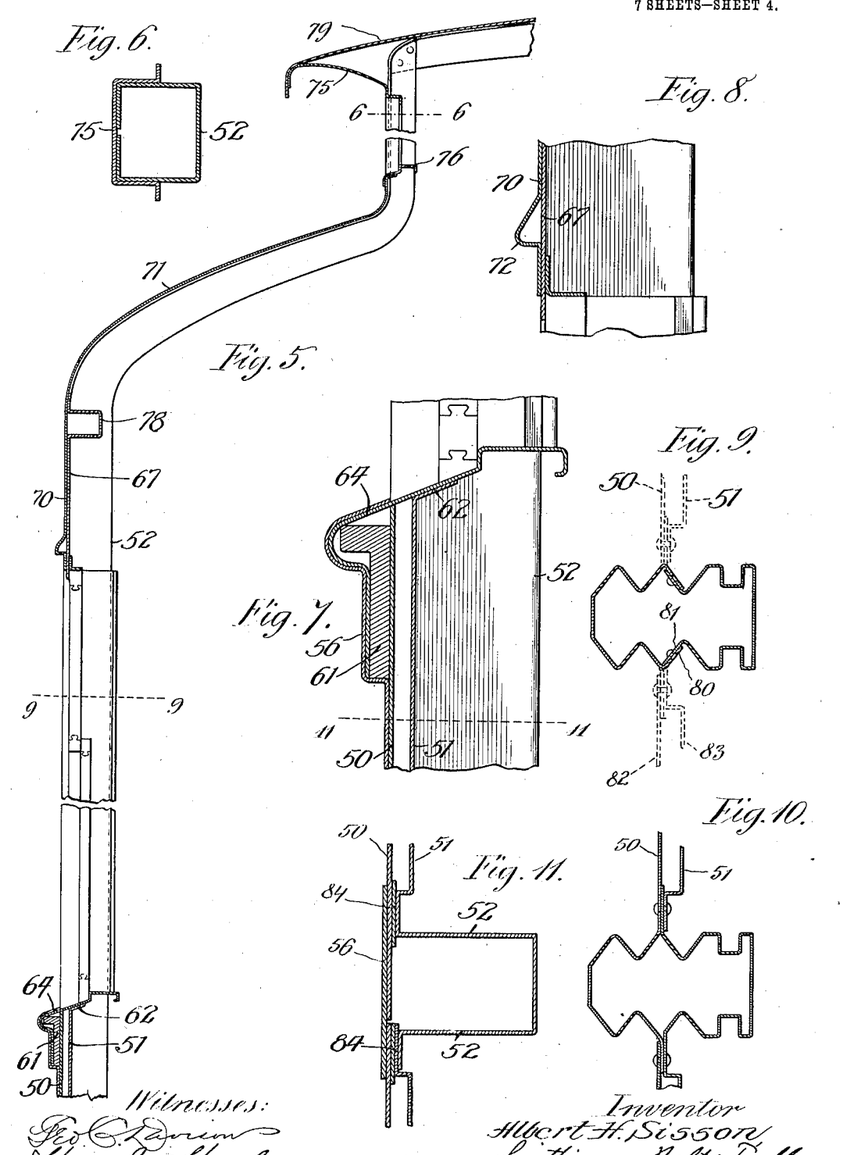
Fig. 5 is a fragmentary vertical transverse section showing the construction which is partially illustrated in Figs. 3 and 4.
Fig. 6 is a transverse section on the line 6—6 of Fig. 5.
Fig. 7 is an enlarged fragmentary vertical sectional view showing the truss member, the sash stool and the parts immediately associated therewith.
Fig. 8 is a fragmentary enlarged vertical section showing the construction of the upper part of the sash frame and the sheathing associated therewith.
Fig. 9 is a transverse section on the line 9—9 of Fig. 5, when the post is formed of both outer and inner sheathing.
Fig. 10 is a section similar to Fig. 9 but taken on a plane just below the sash stool.
Fig. 11 is a section on the line 11—11 of Fig. 7.

In Figs. 3 to 11 inclusive, I have illustrated a modified construction in which a car with a monitor roof is shown. The general construction shown in these figures is much the same as that shown in Fig. 2. It will be noticed, however, that the car line 73, extends upwardly to the deck plate 75, whereas the roof 71 extends upwardly to the deck sill 76. The roof 71 as in the case of the construction shown in Fig. 2, is integral with the outer portion of the letter-board. The car line 73 is provided with an integral flange 77, to which the roof 71 may be suitably attached by means of rivets or otherwise. The side plate 74, having the rib-like extension 78, is integral with the inner sheathing 51. As best shown in Fig. 5, the clear roof 79 extends over the deck plate 75. The lower edge of the deck plate 75 is pressed inwardly thereby forming a rabbet and the aperture for the deck windows. Figs. 7 and 8 show enlarged sectional views of parts which are shown in Fig. 5 and will be readily understood. Fig. 9 is a transverse section through one of the sash guide posts, the dotted lines indicating the form it assumes below the sash stool or belt rail, this latter form also being shown in full lines in Fig. 10. In this case, the edge 80, instead of being riveted to the surface 81, of the post lies between the sheet 82, which forms part of the outer sheathing 50 and the sheet 83, which forms part of the inner sheathing 51. In Fig. 11, is shown a sectional view through the lower part of one of the car posts 52, the cover strip 56, the inner sheathing 51, and the outer sheathing 50. The strips 84 of insulating material are inserted between the outer and inner sheathing 50 and 51 for the purpose of keeping out the cold.

Figures 12, 13, 14:
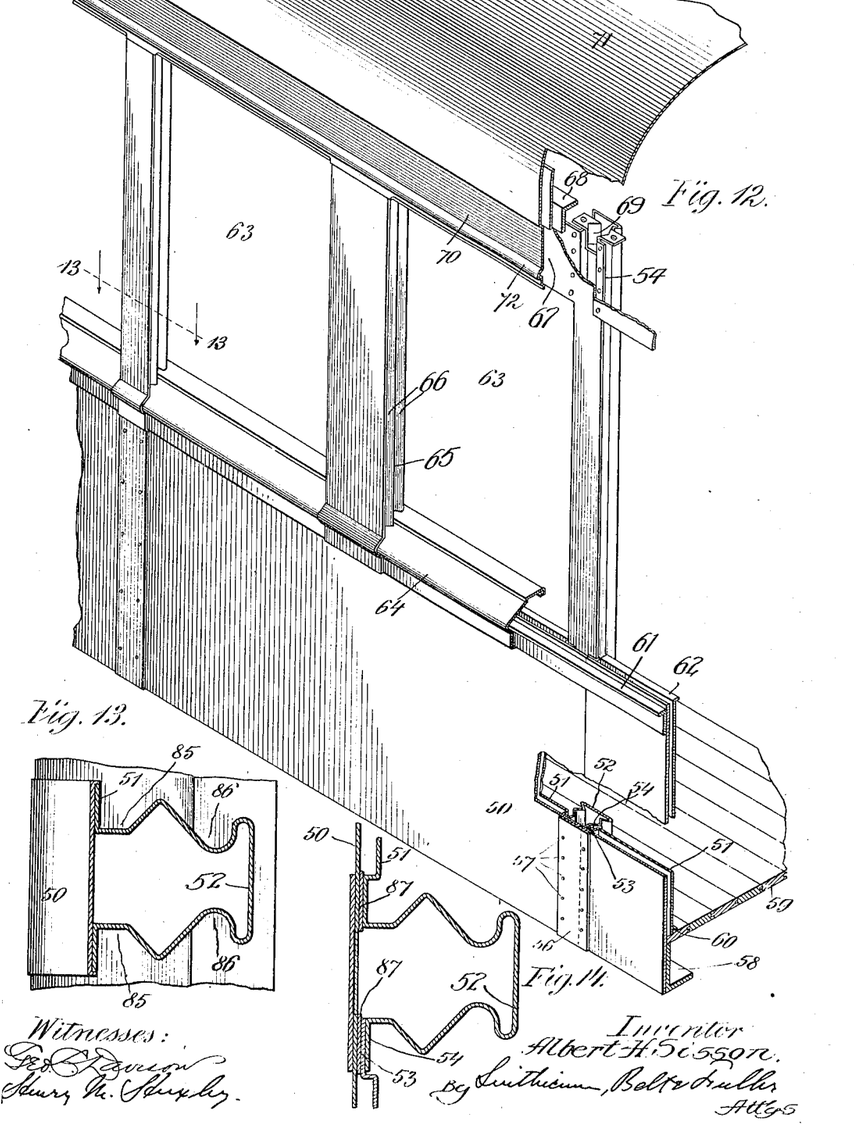
Fig. 12 is a fragmentary perspective view similar to Fig. 1, but showing the sash frame or guides as formed integral with the inner sheathing. The outer facing for the car posts is made integral with the outer sheathing.
Fig. 13 is a transverse section on the line 13—13 of Fig. 12.
Fig. 14 is a transverse section through the lower part of the car post.

In Figs. 12, 13 and 14, I have illustrated a form of car which is much similar to that shown in Fig. 1 except that the sash guides are made integral with the posts and the inner instead of the outer sheathing. The outer facing of the post is, on the other hand, made integral with the outer sheathing.

In the section of the car post which is shown in Fig. 12, it will be noted that the inner portion of the car post 52 is made integral with the inner sheathing 51. It will be seen that the flange 54 engages the extension 53 of the inner sheathing 51 on one side of the post in a similar manner to that shown in Fig. 1.

In Fig. 13 is shown a section of the post 52 in which the inner sheathing 51 is so constructed that the grooves 85 and 86 are formed in the sides of the post which thus acts as a sash and curtain guide. At the same time, the outer sheathing 50 forms the outer portion of the post.

In Fig. 14 the insulating strips 87 are shown inserted between the outer sheathing 50 and the inner sheathing 51 near the point at which the inner sheathing is bent to form the post.

Figures 15, 16, 17, 18, 19, 20, 21, 22:
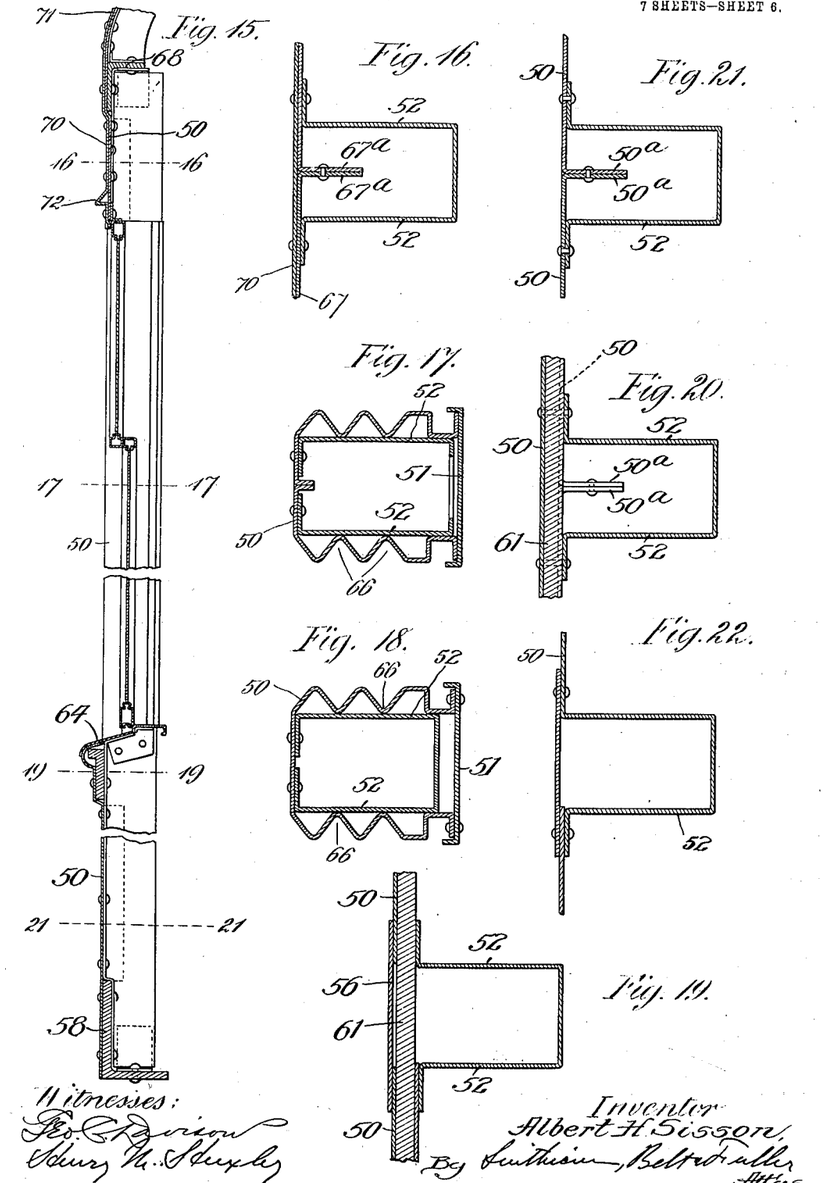
Fig. 15 is a vertical transverse section through the side and part of the roof of a car showing the outside sheathing, the sash frame and the inside of the letter board as integral. The roof and the outside portion of the letter board are also made integral, and the car post is made a separate structure.
Fig. 16 is a transverse section on the line 16—16 of Fig. 15.
Fig. 17 is a transverse section of a car post taken on the line 17—17 of Fig. 15. In this section it is assumed that the post is constructed with a joint between the sheets of which the post is formed.
Fig. 18 is a transverse section of one of the car posts similar to Fig. 17 except that there is no joint between the sheets of the outer sheathing with which the post is formed integral.
Fig. 19 is a transverse section on the line 19—19 of Fig. 15.
Fig. 20 is a transverse section similar to Fig. 19, but taken where a joint occurs between the sheets forming the sheathing.
Fig. 21 is a section on the line 21—21 of Fig. 15, taken where there is a joint between the sheets of the sheathing.
Fig. 22 is a transverse section of a modified form of car post in which the outside sheathing forms the main post, whereas the sash frames or guides are formed as separate members. These guides may be formed as shown, for example, in Fig. 18.

In Figs. 15 to 22 inclusive, a modification of the car is shown in which the outside sheathing, the sash guides and the inside portion of the letter-board are made integral. The roof of the car and the outside portion of the letter-board are also integral. The car posts 52 are made as separate structures. As shown in Fig. 16, the sheathings 67 are inwardly turned at 67ᴬ and riveted together; the joint thus formed being concealed from view by means of the post 52. As clearly indicated in Figs. 17 and 18, the outer sheathing 50 is formed around the post 52 in order to form the grooves 66. Fig. 17, illustrates a construction in which the joint between two adjacent sheets of the outer sheathing 50 occurs opposite the post 52, whereas in Fig. 18 a single sheet is illustrated as forming two sash guides on the opposite sides of the post 52. It will be noted that the outside portion of the letter-board is formed integral with the roof 71, whereas the inner portion 67 is made integral with the outside sheathing of the car. In Figs. 20 and 21 the sheathings 50 are shown as turned inwardly at 50ᴬ and riveted together; the said joint being concealed from view by the post 52. In Fig. 22 a modification is illustrated in which the outside sheathing 50 is formed into the car post 52. In this case the sash guides such as are shown in Figs. 17 and 18 are formed as separate members and suitably attached to the post 52 by means of rivets.

Figures 24, 25, 26:
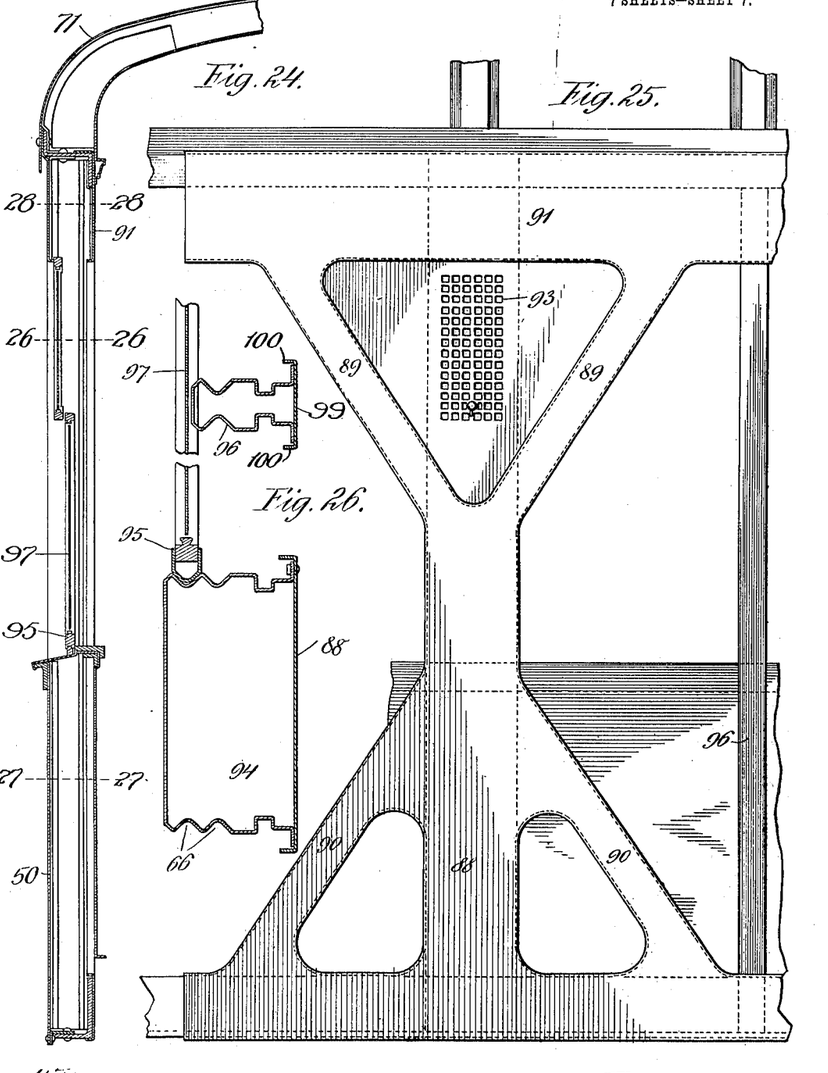
Fig. 24 is a vertical transverse section taken on the line 24—24 of Fig. 23.
Fig. 25 is an enlarged side elevation showing one of the car posts having obliquely disposed braces.
Fig. 26 is an enlarged transverse section taken on the line 26—26 of Fig. 23.

In Figs. 23 and 28 inclusive, I have illustrated a form of car in which alternate car posts are provided with obliquely disposed braces at their upper and lower portions, these car posts being integral with the inner sheathing 51. As shown in Figs. 23 and 25 the inner walls 88 of the car posts have the braces 89, 89, at their upper ends and the braces 90, 90 at their lower ends. The braces 89, 89 are formed integral with the frieze or inside finish 91, of the car. Between the braces, 89, 89 is the triangularly shaped aperture 92 through which the ventilator 93 in the side of the car may be seen. The inner walls 88 of the car posts 94 are connected to the latter, as best shown in Fig. 26, by means of rivets or other suitable devices; on the outside of the posts 94 is located the outer sheathing 50. The sides of the posts 94 are provided with the grooves 66 which are adapted to receive the window sashes 95. Besides the posts 94 in this modification, I also provide intermediate posts 96 which, as shown in Fig. 27 may be attached to the inner sheathing 51. In certain cases, as illustrated in Fig. 26, the intermediate posts 96 extend up inside of the glass 97 in the window sash 95 but this sash is held in position between two of the posts 94.

Sectional views of the intermediate posts 96, at different points, are shown in Figs. 27 and 28. In Fig. 27, which is a section through intermediate post 96 taken on the line 27—27 of Fig. 24, the post 96 is confined between the box-like member 98, attached to the outer sheathing 50 and the strip 99 having the inturned flanges 100, 100 and being fastened to the inner sheathing 51.

The section shown in Fig. 28 is a section through the top part of the intermediate post. The strip 99 is a reinforcement back of the joint 101 between the upper or frieze portions 91, 91 of the inner sheet 88.

It will be apparent to those skilled in the art that many changes may be made in the exact structure of the various modifications which I have shown without departing from the spirit of my invention.

What I claim is:

1. In a car, the combination of a car post, a sheathing sash guides integral therewith, and a letter-board integral with said sheathing, substantially as described.

2. In a car, a letter-board comprising a plurality of sheets, one of said sheets having a continuation forming the top of the car, and a second of said sheets having a continuation forming a post of said car, substantially as described.

3. In a car, the combination of a car post, and a sheathing integral therewith, a portion of the car post extending above the main body of said sheathing, substantially as described.

4. In a car, the combination of an inner sheathing, and a car post formed integral with said sheathing and extending beyond the upper edge thereof, substantially as described.

5. In a car, the combination of sheathing having upper and lower portions, and a car post integral with one of said sheathing portions and extending on the inner side thereof between the upper and lower portions, substantially as described.

6. In a car, the combination of a car post, a roof and inner and outer side sheathing, one of the sheathings integral with the roof and the other integral with the post, substantially as described.

7. In a car, the combination of a car post, a roof, an inner and outer side sheathing, the outer sheathing formed integral with the roof, and the inner sheathing formed integral with the post, substantially as described.

8. A car sheathing comprising a plurality of sheets, one of said sheets having a post formed therein with a flange offset in a plane parallel to the sheet and overlapping the adjacent sheet, said joint thereby maintaining the bodies of said sheets in a common plane, substantially as described.

9. A car sheathing comprising a plurality of sheets, one of said sheets having a post formed along its margin and integral therewith, the outer edge of said post being relatively offset in a plane parallel to the body of the sheet whereby to maintain the bodies of the adjacent sheets in a common plane, substantially as described.

10. A sheathing for a car comprising a plurality of sheets offset along their margins in a plane parallel to the body of the sheet, the offset margin of one sheet having overlapping engagement with the other sheet whereby to maintain the two sheets in a common plane, substantially as described.

11. A car sheathing comprising a plurality of sheets, the adjacent margins of said sheets being offset in a plane parallel to the bodies of said sheets, and a post connecting said offset margins and integral with one of the sheets, substantially as described.

12. In a car, the combination of an outer sheathing and an inner sheathing, and a car post formed integral with one of said sheathing and extending above the main body of said sheathing, substantially as described.

ALBERT H. SISSON.

Witnesses:
HENRY M. HUXLY,
MYRA W. ROSENOW.